Jan. 16, 1962      R. W. MEYER      3,017,011
APPARATUS FOR HANDLING AND TREATING VIALS
Filed Oct. 20, 1959      4 Sheets-Sheet 1
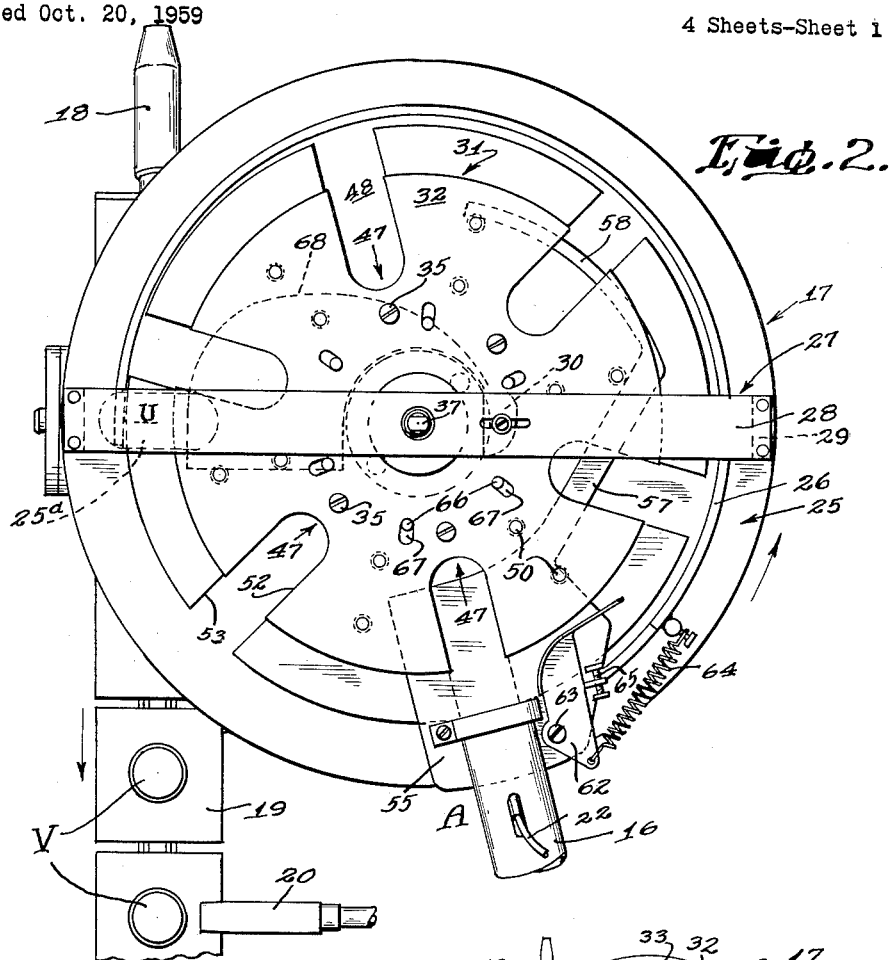
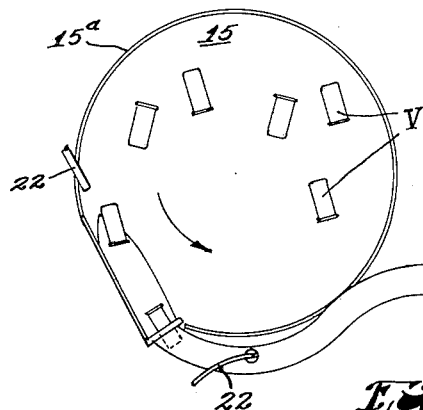
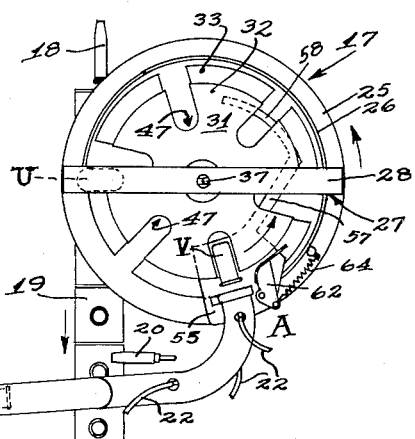
INVENTOR.
ROBERT W. MEYER
BY J. Ralph Hoge
W. A. Schaich
ATTORNEYS Jan. 16, 1962 R. W. MEYER 3,017,011
APPARATUS FOR HANDLING AND TREATING VIALS
Filed Oct. 20, 1959 4 Sheets-Sheet 2

INVENTOR.
ROBERT W. MEYER
BY J. Ralph Hoge
W. A. Schaich
ATTORNEYS

Jan. 16, 1962  R. W. MEYER  3,017,011
APPARATUS FOR HANDLING AND TREATING VIALS
Filed Oct. 20, 1959  4 Sheets-Sheet 3

INVENTOR.
ROBERT W. MEYER
BY J. Ralph Hoge
& W. A. Schaich
ATTORNEYS

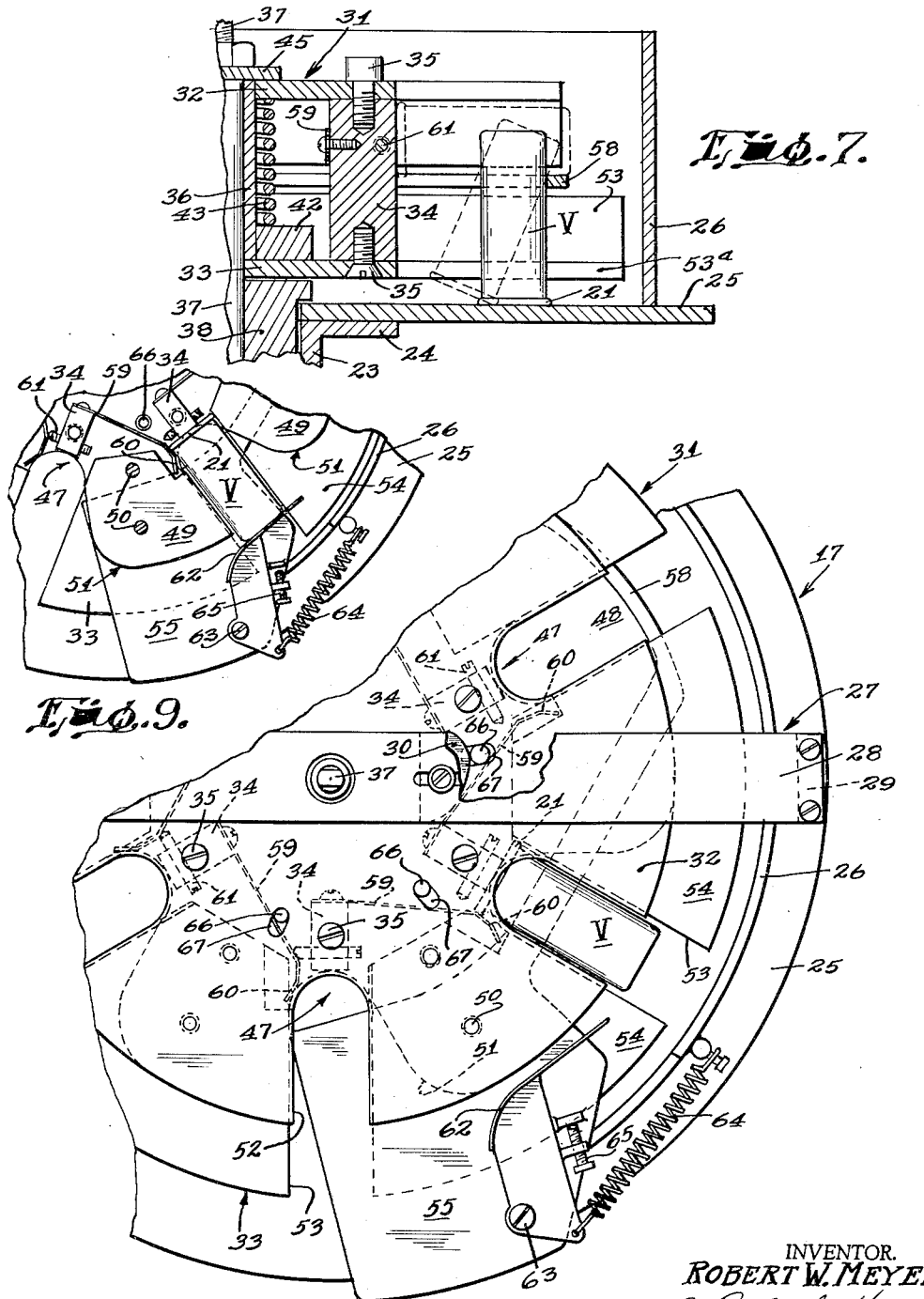

in the illustrated embodiment of my invention, it comprises an unscrambler table 15, FIG. 1, a conduit 16, an orienting unit 17 to which vials V are transferred from the table 15 by means of said conduit. From this orienting unit 17 the vials, in upright position with the open end lowermost, are telescoped over the spindles 18 of a conveyor 19, the latter carrying the spindle supported vials past a flame heater 20 or some other work performing device. The vials, which may be formed of a plastic material such as polystyrene, require flame treatment of the exterior surfaces to prepare such surfaces for the application of labels thereto. Hence, in the present application the previously mentioned flame heater 20 is positioned at one side of the spindle-type conveyor. Incidentally, these vials ordinarily are formed with an external annular bead 21 at the open end or mouth. These vials are placed in random fashion upon the unscrambler 15, FIG. 1, and due to rotation of the latter about a vertical axis centrifugal force moves these vials to the peripheral areas near the confining wall 15a of the table so that they successively enter the conduit 16. Streams of air under pressure are supplied through nozzles 22 to accelerate movement of the vials into and through the conduit to the orienting unit 17. These vials enter the conduit in random fashion in that some advance open end first and others closed end first. The obvious function of the orienting unit 17 is to rearrange these vials so that they are uprighted open end lowermost for delivery by gravity to positions in which they are telescoped over the spindles 18.

UNITED STATES PATENT OFFICE

3,017,011
APPARATUS FOR HANDLING AND TREATING VIALS
Robert W. Meyer, South Elgin, Ill., assignor to Owens-Illinois Glass Company, a corporation of Ohio
Filed Oct. 20, 1959, Ser. No. 847,532
18 Claims. (Cl. 198—33)

The present invention relates to apparatus for handling and surface treating vials which are formed of plastic or some similar material and has for an important object the provision of simple automatic mechanical means which receives vials in random recumbent positions, uprights such vials with their open end lowermost by means utilizing the force of gravity and then deposits the vials so uprighted upon conveyor spindles which carry them past a work performing device, a flame heater, for example.

Another object of my invention is the provision of a vial orienting unit in which vial accommodating pockets are arranged in an endless series for movement along a closed horizontal path, such pockets each having an open lower side permitting temporary supporting engagement of the pocketed vials by means of a rail which also operates to turn recumbent vials to an upright position upon a floor for ultimate delivery to work performing mechanism.

A further object of my invention is the provision of a novel vial orienting unit having pockets to receive the vials in recumbent positions, but in random fashion with respect to the position of the open end of the vials in the pockets and turning the latter incident to their removal from the pockets so that they assume upright positions, open end lowermost, for telescopic placement upon spindles of a conveyor system.

It is also an object of my invention to provide in a vial orienting unit having an endless series of generally horizontal vial accommodating pockets, means for effecting removal of vials from the pockets at selected stations as determined by the position of the vials in the pockets, that is, whether they have entered such pockets open or closed end first, and uprighting the vials as they are removed and placing them open end lowermost for gravity delivery to the spindles of a conveyor.

Other objects will be in part apparent and in part pointed out hereinafter.

In the drawings:

FIG. 1 is a schematic plan view showing the unscrambler table, conduit, orienting unit and the spindle-type conveyor which carries inverted vials past a flame heater or other work performing device.

FIG. 2 is a detail top plan view of the orienting unit.

FIG. 7 is a view similar to FIG. 6 but taken along the line 7—7 of FIG. 5 showing successive positions of the vials as they move by gravity from a position with the open end innermost in the pockets to a position in which the open end contacts a supporting floor.

FIG. 8 is a fragmentary detail plan view.

FIG. 9 is a fragmentary plan view showing cam pusher means for insuring proper positioning of vials in the pockets of the orienting unit.

Figure 3:
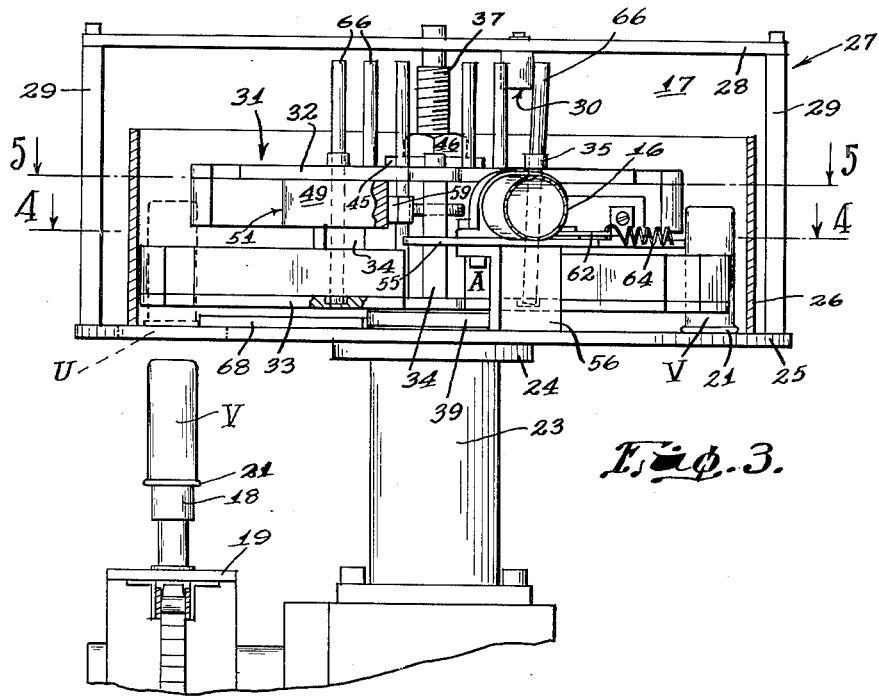
FIG. 3 is a transverse vertical sectional view of the orienting unit with parts in elevation and shows one of the conveyor spindles in vial receiving position.

The orienting unit in its broadest aspects comprises a series of pockets moving in a closed horizontal path between loading and unloading stations, these pockets being elongated with their axis disposed horizontally and intended to accommodate vials occupying recumbent positions with either the closed or open end innermost in said pockets. As the pocketed vials advance toward the unloading station they turn vertically about a horizontal fulcrum under the influence of gravity until upright positions have been assumed. These uprighted vials, upon reaching the unloading station, drop vertically downward over the spindles 18 which are brought in succession to a receiving station, the latter being in register with the unloading station of the orienting unit. Obviously the orienting unit and spindle-type conveyor operations are synchronized to insure proper timed arrival of the spindles at the vial transfer point in relation to the discharge of vials V from the unit 17.

More specifically the orienting unit comprises a stationary hollow vertical column 23 having a flange 24 at its upper end upon which a fixed floor 25 is supported. This floor is a ring-like flat plate which supports an upstanding confining wall 26 (FIGS. 1, 2 and 4) extending a substantial distance about the unit. A frame 27 straddles the wall 26 and includes a horizontal cross-member or bar 28 and depending supporting legs 29 which may be welded to marginal portions of the floor 25. A cam 30 carried by the bar 28 is adjustable longitudinally thereon, such cam functioning to effect the release of pocketed vials for uprighting in a fashion which will become apparent presently.

A peripherally pocketed rotor 31 is mounted immediately above and coaxially with the fixed floor 25, such rotor being positioned between said floor and the aforementioned frame 27 and within the confines of the upstanding wall 26. This rotor, (FIGS. 3, 6 and 7) comprises upper and lower rings 32 and 33, respectively, which are held assembled in vertical spaced relationship by means of spacing blocks 34. Screws 35 or the like fasteners secure the blocks 34 and the rings 32 and 33 together. A sleeve 36 (FIGS. 4, 5, 6 and 7) is positioned coaxially with the upper and lower rings 32 and 33 and is telescoped over an assembly rod 37 which extends axially upward through said sleeve 36. This assembly rod is also axially disposed within the fixed column 23, there being interposed between this rod and said column and coaxially therewith a driven tubular shaft 38, the upper end of which is formed with a radial flange 39 in the upper side of which recesses 40 are provided for driving engagement with a plurality of driving pins 41. These driving pins are mounted in a ring 42 which encircles the aforementioned sleeve 36 and is yieldingly held in its lowermost position against the lower ring 33 of the rotor by means of a coil spring 43 which encircles said sleeve. Openings 44 in the lower ring 33 of the rotor accommodates portions of the pins 41 allowing the tapered lower end of pin to project into the recesses 40 for the purpose of driving the rotor. The upper end of the aforementioned rod 37 extends through a cap plate 45 which rests upon the upper ring 32 of the rotor and above this cap plate is screw-threaded to accommodate a locking nut 46.

The vial accommodating pockets 47 are uniformly spaced about the periphery of the rotor, such pockets being elongated horizontally with their axes disposed radially of the rotor. Each pocket has an open outer inlet end 48 and an inner end, which, in the illustrated embodiment, is closed by one of the ring spacers 34. Both the upper and lower sides of the pockets are open, the latter open side providing a discharge opening for vials making their exit from the pockets for uprighting upon the floor 25. The pockets lie between and are formed by an annular series of blocks 49 (FIGS. 3, 5 and 8) which are secured to the lower side of the upper ring 32 by screws 50, or the like fasteners. At the entrance end of each pocket, the forward wall is curved or formed on a radius 51 to facilitate the entry of vials into the pockets from the conduit 16. The upper ring 32 is provided with radial recesses 52 in register with and, except for the radius just mentioned, corresponding in contour with the pockets 47.

Beneath the pockets and in register therewith are recesses 53 formed by an annular series of blocks 54 which are carried by the lower ring 33 of the rotor. This ring and the blocks 54 together constitute a vial advancing or forwarding means functioning to move uprighted vials along the floor 25 to an outlet opening 25a which is formed in the floor at an unloading station U. The recesses 53 and corresponding recesses 53a in the lower ring 33 of the rotor are of somewhat greater length than the pockets 47 for reasons which are obvious by reference to FIGS. 4, 5 and 6.

As has been explained heretofore, the vials enter and move in random fashion through the supply tube or conduit 16 and for that reason some of the vials enter the pockets of the rotor mouth-end first while others are in a reverse position having the open or mouth-end outermost. It is necessary that all of these vials, irrespective of their initial positions in the pockets, ultimately assume an upright position on the floor 25 with their open ends lowermost so that when they drop through the discharge opening 25a they may be telescoped over the spindles 18 of the conveyor. To this end, it is necessary, as to those vials which positioned mouth-end outermost in the pockets that they be turned in a generally vertical plane in a direction to bring said open ends into contact with the floor. This requires (FIG. 3) that the vials turn in a generally clockwise direction. On the other hand, if the vials are positioned mouth-end innermost in the pockets (FIG. 7) they will turn in a generally counter-clockwise direction about a substantially horizontal fulcrum.

At the loading station A (FIGS. 1, 2, 3 and 5) a fixed horizontal platform 55 is positioned intermediate the upper and lower sets of pocket forming blocks. This platform is common to all of the pockets and provides a temporary bottom closure for the pockets at the loading station A. Thus, as the vials are discharged from the feed tube or conduit 16 they advance across this platform into pockets. A bracket 56 (FIG. 3) carried by the stationary floor 25 supports the platform 55. Extending forwardly and gradually approaching the periphery of the rotor is a narrow horizontal rail 57 (FIGS. 4, 5, 6 and 7). The entrance end of this rail section 57 is in proximity to the path of travel of the inner end of the pockets while the exit end is substantially at the periphery of the rotor. Thus, the rail initially contacts the vials at a point to one side of the transverse center of gravity of the vials and on that side nearest the axis of the rotor. As a consequence, those vials which are positioned in the pockets mouth-end outermost will begin to turn vertically downward in a clockwise direction as explained heretofore and gradually assume upright positions as the rotor advances and the vials move along and in contact with the rail section 57. It is apparent that since this rail section 57 is shaped and positioned as explained heretofore, it will function as a fulcrum controlling the turning and uprighting of the vials under the influence of gravity. At the exit end of the rail, these uprighted vials move beyond the influence of the pockets 47 and from that point on will be advanced to the discharge opening 25a by reason of their being confined in the outer portions of the recesses 53 and 53a.

Those vials which enter the pockets mouth-end innermost must be held firmly therein until they have advanced beyond the influence of the rail section 57 to a second rail section 58 (FIG. 5) which will serve as a fulcrum permitting the vials to turn vertically in a generally counter-clockwise direction under the influence of gravity whereby to position said vials upright open end lowermost upon the floor 25. In order to releasably hold the vials in the pockets for the purpose just explained, a spring finger 59 individual to each pocket is mounted upon one of the spacers 34, such finger having its free end 60 shaped for frictional holding engagement with the outer wall of the vial mouth. An adjusting screw 61 carried by each spacer 34 provides means for controlling the vial gripping position of the finger and determining the pressure of the finger upon the article.

Figure 4:
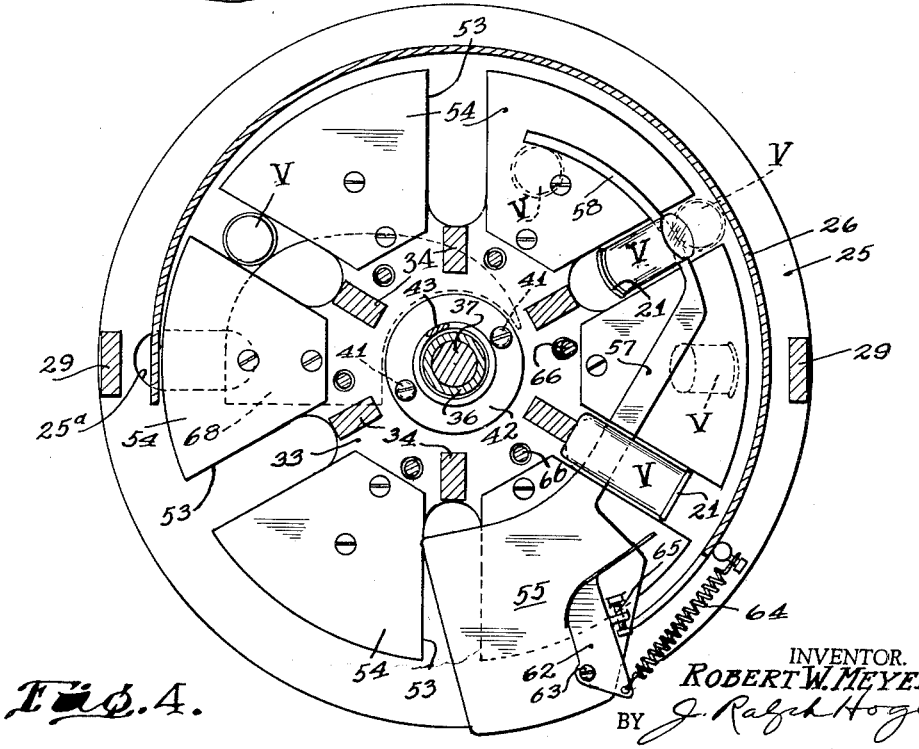
FIG. 4 is a sectional plan view taken substantially along the plane of line 4—4 of FIG. 3.
Figure 5:
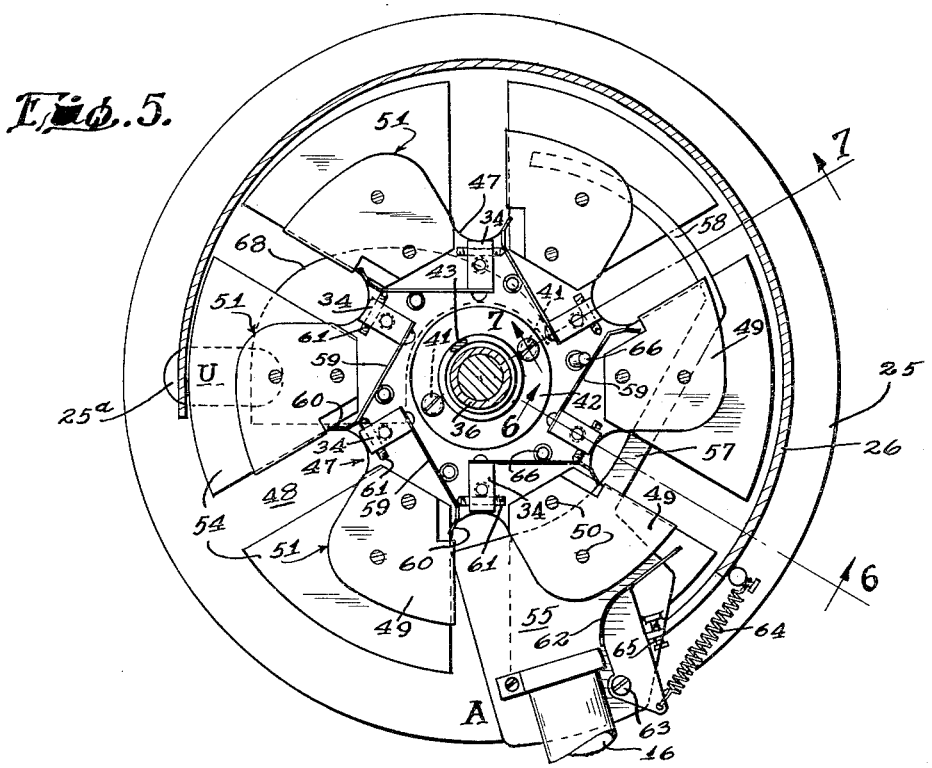
FIG. 5 is a sectional plan view taken substantially along the plane of line 5—5 of FIG. 3.
Figure 6:
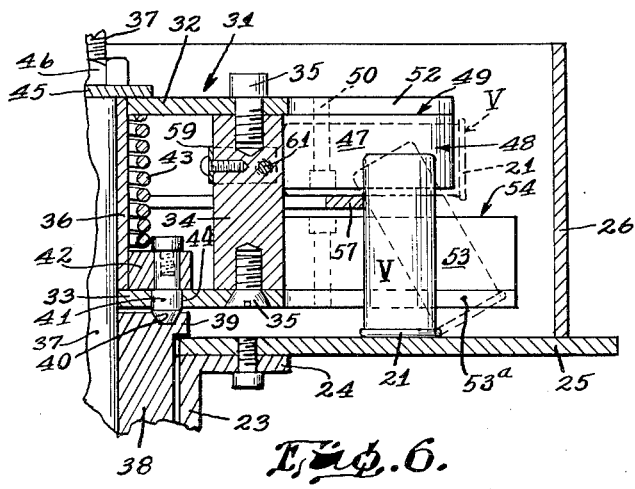
FIG. 6 is a fragmentary vertical sectional view partly in elevation taken along the line 6—6 of FIG. 5, showing uprighted vials which initially occupied positions in the pockets with their closed or bottom end innermost.

In order to insure that the vials will occupy the innermost position in the pockets, a cam plate 62 (FIGS. 4, 5 and 9) is pivoted to the platform 55 by means of a vertical hinge pin 63 and is so positioned on the platform that it engages the adjacent end of advancing vials and, if necessary, moves them axially inward the maximum possible distance. A coil spring 64 yieldingly holds the cam plate in its innermost position, the latter being variable and under the control of adjustable stop means 65. Such adjustment compensates for variations in the length of the vials being handled. Release of the vials from the holding influence of the spring fingers 59 is obtained by means of actuating pins 66 (FIGS. 3, 5 and 8) which are arranged in an annular series in close proximity to the aforementioned spacers 34. These pins are anchored in the lower ring 33 (FIG. 3) and intermediate their ends extend through radial slots 67, their extreme upper ends being positioned for engagement with the aforementioned fixed cam 30 at one point in their path of travel. With engagement of one of these pins with the cam, such pin is in part moved radially outward against the corresponding spring finger 59 flexing the latter out of holding contact with the vial. This occurs substantially at the position shown in FIG. 7 with the result that under the influence of gravity the vial turns in a generally counter-clockwise direction and assumes an upright position on the floor 25. Those vials which are uprighted by means of the second section rail 58 advance in a counter-clockwise direction with the rotor and are moved radially outward by means of a stationary cam section 68 which is secured to the floor 25 as shown in FIGS. 3, 4 and 5. This cam section is shaped to move the vials into the same path as that of the vials which have been uprighted by the first rail section 57 so that upon arrival at the unloading station they will fall by gravity through the discharge opening 25a and assume positions in which they are telescoped over the spindles 18.

Modifications may be resorted to within the spirit and scope of the appended claims.

I claim:

1. In apparatus for orienting vials and discharging them seriatim with an open end lowermost for gravity telescopic positioning over upstanding spindles as the latter are brought in succession to a vial receiving station beneath the apparatus, a rotor mounted for rotation on a vertical axis, said rotor having a series of circumferentially spaced pockets opening radially outward through its periphery and movable by rotation of the rotor past vial loading and unloading stations, each of said pockets having a closed inner end and an open lower side and being elongated radially of the rotor to receive vials in a recumbent position with their axes disposed in a generally radial direction, means common to the pockets for insuring placement of vials in their innermost position in the latter, a floor beneath the rotor provided with a discharge opening at the vial receiving station, a fixed horizontal vial support between a segment of the path of travel of the pockets and said floor, said support shaped and positioned relative to the axes of the pockets to provide a horizontal fulcrum extending generally normal to the axes of the pockets and about which pocketed vials turn under the influence of gravity and assume upright positions upon the floor and means for advancing the uprighted vials along the floor to said discharge opening.

2. Apparatus as defined in claim 1, the means for placing vials in their innermost position in the pockets being a cam plate positioned radially outward of the periphery of the rotor adjacent the loading station and means yieldingly urging the cam plate radially inward for engagement with adjacent ends of pocketed vials.

3. Apparatus as defined in claim 1, the means for placing the vials in their innermost position in the pockets being a pivoted cam plate adjacent the periphery of the rotor and just beyond the loading station and spring means urging the plate generally radially inward for engagement with pocketed vials.

4. Apparatus as defined in claim 1, said vial support in part being a narrow horizontal rail including a first section having an entrance end positioned radially inward from the center of gravity of vials in the pockets and an exit end near the periphery of the rotor and a second section positioned radially outward of said center of gravity with an entrance end joined to the exit end of the first section, means at the inner end of each pocket for releasable holding engagement with the open end of a vial and a cam device for actuating the last named means substantially upon arrival of a vial accommodating pocket in the vicinity of said second section of the vial support to release vials.

5. Apparatus as defined in claim 4, the vial holding means at the inner end of each pocket being a spring finger for frictional engagement with the open end of a vial.

6. Apparatus as defined in claim 4, said first section of the rail having circumferentially spaced entrance and exit ends with the latter positioned near the periphery of the rotor and the entrance end in proximity to the path of travel of the inner ends of the pockets and said second section being generally concentric with the rotor and joined to the exit end of said one section but with a portion thereof nearer the axis of the rotor than the juncture of the two sections.

7. Apparatus as defined in claim 4, there being a relatively wide platform at the loading station in the plane of said rail to support the vials as they enter the pockets.

8. Apparatus as defined in claim 6, there being a relatively wide platform at the loading station in the plane of said rail to support the vials as they enter the pockets.

9. Apparatus as defined in claim 1 and an upstanding confining wall extending about the rotor and vial advancing means from a point just beyond the loading station to a point in proximity to the unloading station.

10. Apparatus as defined in claim 5, each spring finger normally being in position to frictionally holdingly engage the open end of a vial upon arrival of the latter at its innermost position in a pocket and means operable with arrival of a pocket at a predetermined position in its path of rotation for retracting the spring finger from contact with the vial.

11. Apparatus as defined in claim 10, each spring finger retracting means being a vertical pin mounted for generally radial movement relative to the rotor to flex the spring finger and a fixed cam common to the pins for shifting them into operative engagement with the spring fingers in succession.

12. In apparatus for orienting vials, each having an open end, and discharging them seriatim open end down for gravity telescopic positioning upon upstanding spindles as the latter are brought into succession to a vial receiving station, said apparatus comprising an annular series of vial receiving pockets rotatable about a vertical axis past circumferentially spaced-apart vial loading and unloading stations, the pockets being horizontally positioned with their axes disposed radially, each of said pockets having an open outer end, a closed inner end and an open lower side, said pockets adapted to receive vials with either the open or closed end innermost, a floor beneath the series of pockets, means for removing vials from the pockets and uprighting them each with its open end resting upon said floor, the last named means comprising a horizontal rail extending generally in the direction of travel of the pockets from the loading station and including two sections arranged end to end with each having entrance and exit ends one section being in part nearer the axis of rotation of the pockets than the other and both sections at least in part being positioned at one side or the other of the center of gravity of vials in the pockets whereby the rail serves as a fulcrum about which vials turn by gravity to an upright position on the floor, means for moving the uprighted vials into an arcuate path located radially outward of said pockets and means for advancing the uprighted vials along said path, the floor having a discharge opening through which vials drop by gravity onto the spindles.

13. Apparatus as defined in claim 12, that section of the horizontal rail in proximity to the loading station having an entrance end nearer the axis of rotation of the pockets than its exit end and the next succeeding section.

14. Apparatus as defined in claim 12 and a platform common to all of the pockets for closing the lower side of the latter while receiving vials at the loading station, said platform lying in the same plane as the horizontal rail.

15. Apparatus as defined in claim 12 and means at the inner end of each pocket for releasable holding engagement with the open end of a vial.

16. In combination an endless series of vial accommodating pockets movable in a closed horizontal path past vial loading and unloading stations, said pockets each having an open inlet end for vials and an open lower side for the downward discharge of vials, each of said pockets being elongated with its axis disposed horizontally and having the open end facing outwardly of the closed path of travel of the pockets, means for placing vials in recumbent positions in the pockets at said loading station, a floor extending along and below the path of travel of the pockets, a fixed horizontal platform common to all of said pockets for closing the open side thereof at the loading station and supporting the vials in the pockets at said station, means beyond said platform comprising a narrow horizontal rail extending generally along said path and at least in part to one side of the center of gravity of the vials and utilizing the force of gravity for removing vials from the pockets and uprighting them upon the floor and means for advancing the upright vials to the unloading station.

17. The combination defined in claim 16, the vial uprighting means being a horizontal rail extending forwardly from said platform and having first and second sections arranged end to end and having entrance and exit ends, the first section having its entrance end nearer than the exit end to the open end of the pockets and both sections being at least in part to one side or the other of the transverse center of gravity of the pocketed vials whereby said vials fall by gravity to one side or the other of the rail and assume upright positions on the floor.

18. The combination defined in claim 17, the first rail section throughout a major part of its length being positioned nearer the closed end of the pockets than the second section and releasable means for retaining in said pockets until they arrive at said second station those vials which enter the pockets open end first.

References Cited in the file of this patent
UNITED STATES PATENTS

| | | |
|---|---|---|
| 2,775,334 | Jeremiah | Dec. 25, 1956 |
| 2,857,039 | Whitecar | Oct. 21, 1958 |